No. 638,378. Patented Dec. 5, 1899.
W. S. CASTERLIN.
TONGS.
(Application filed Sept. 8, 1899.)
(No Model.)
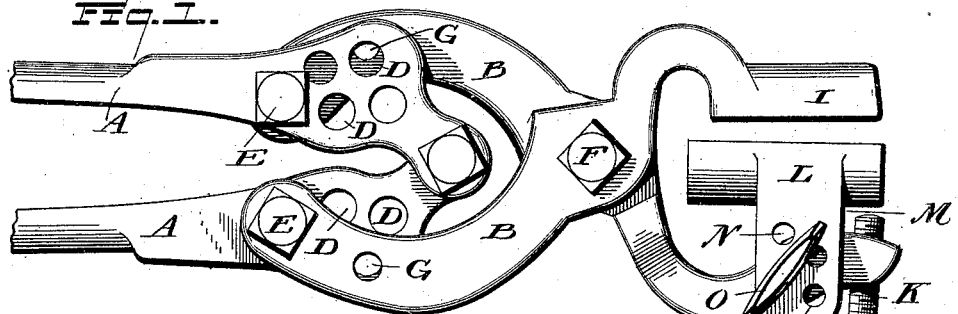
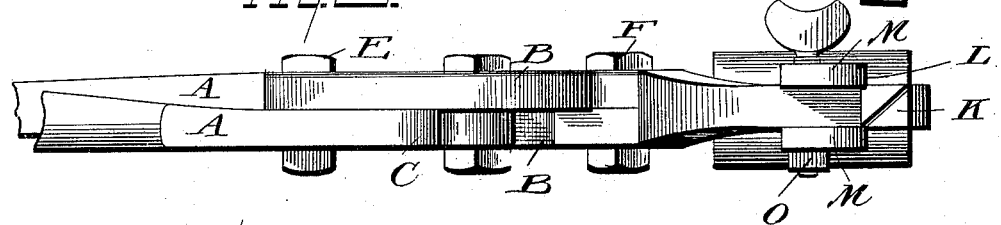
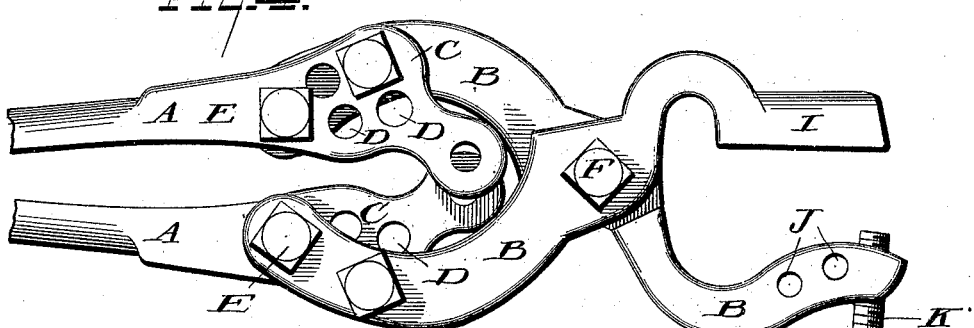
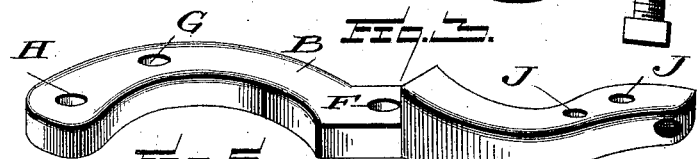
Witnesses
L. C. Hills
G. M. Copenhaver
Inventor:
W. S. Casterlin,
By R. W. Bishop, Attorney

UNITED STATES PATENT OFFICE.

WARREN S. CASTERLIN, OF PITTSTON, PENNSYLVANIA.

TONGS.

SPECIFICATION forming part of Letters Patent No. 638,378, dated December 5, 1899.

Application filed September 8, 1899. Serial No. 729,849. (No model.)

*To all whom it may concern:*

Be it known that I, WARREN S. CASTERLIN, a citizen of the United States, residing at Pittston, in the county of Luzerne and State of Pennsylvania, have invented certain new and useful Improvements in Tongs, of which the following is a specification.

My invention relates to improvements in metal-working tools of the tongs family; and it consists in certain novel features hereinafter first fully described and then particularly pointed out in the claims.

The objects of my invention are to provide tongs which will be capable of various adjustments in order to vary the power exerted thereby according to the work to be performed and to provide the tongs with jaws of such a nature that objects of any shape may be firmly grasped and held by the tongs. These objects I accomplish by the use of the device illustrated in the annexed drawings, in which—

Figure 1 is a side elevation of tongs embodying my improvements. Fig. 2 is an edge view of the same. Fig. 3 is a detail view of the end of the gripping member to which the adjustable jaw is attached. Fig. 4 is a detail view showing a different adjustment of the handles from that shown in Fig. 1, and Figs. 5, 6, and 7 are detail views showing different forms of adjustable jaws.

My improved tongs comprise the handle or lever members A, which are pivoted together, and the gripping members B, which are also pivoted together and to the lever or handle members. The handle members are pivoted together at their ends, and near their ends they are formed with the enlargements C, in which are a plurality of transverse openings D, through any of which a pivot pin or bolt E may be passed. The gripping members are given a curved formation in their lower portions, so as to pass clear of the ends of the handle members and bring their lower extremities into position to be pivoted to the handle members. The gripping members cross each other at about their centers and are pivoted together at that point, as indicated at F. Below their centers and preferably near their lower extremities the gripping members are provided with the openings G, the purpose of which will presently appear, and at their extremities they are provided with the openings H, through which the pivot-pins are passed to secure them to the handle members. The upper end of one of the gripping members is formed into a jaw I, which is V-shaped, so as to effectually grip pipes or rods in the operation of the device. The upper end of the other gripping member is a bar rectangular in cross-section and having an ogee contour, whereby it presents the bend or recess to accommodate the lower end of the adjustable jaw. Near its upper extremity this gripping member is provided with one or more openings J to receive the pivot-pin which fastens the adjustable jaw thereto, and in the extreme upper end of the same is mounted a set-screw or other adjustable stop K, adapted to bear upon the adjustable jaw, and thereby limit the movement thereof or lock it firmly against a rod or pipe held between the jaws. The adjustable jaw L may be of various forms and is provided with two lugs or arms M, adapted to receive the end of the member between them and provided with a plurality of openings N, through one of which and the opening in the end of the member a pivot pin or bolt O is passed. In Fig. 5 I show the adjustable jaw as being V-shaped, the same as the fixed jaw formed on the end of the coacting gripping-member. In Fig. 6 the adjustable jaw is shown as tapered to an edge, and in Fig. 7 it is shown as being tapered and with a longitudinal groove in the edge.

The operation of the tongs is of course very simple. The lever or handle members are pressed together, and the gripping members are thereby caused to clamp the article to be held. The various adjustable jaws are interchangeable, and the proper jaw to accurately grip the work may be quickly applied to the tongs. When holding large rods or pipes, the V-shaped jaw shown in Fig. 5 will be used; but when grasping flat articles it will be found advantageous to employ the jaw shown in Fig. 6, and for holding small wires the jaw shown in Fig. 7 will be found most advantageous. Should the rod or bar to be held be tapered, the stop K is adjusted so as to permit the adjustable jaw to assume an inclination corresponding to the taper, and consequently clamp and hold the article firmly. Furthermore, by inserting the pivot-pin through one or another of the pivot-openings in the lugs of the adjustable jaw the said jaw is readily shifted so as to apply the pressure most advantageously. This adjustment, moreover, permits the jaw to be varied in its position according to the diameter of the rod or pipe without altering the throw or swing of the tong members. It will be readily seen that the lever or handle members being pivoted together independent of their pivotal connection with the gripping members a compound leverage is exerted on the gripping members, and consequently the operator is enabled to hold the work more easily and firmly than in other forms of tongs. The pressure may be regulated according to the work required by inserting the pivot-pins through one or another of the openings in the levers or handles, and the levers or handles may be caused to swing with the gripping members, so as to act as a simple lever, by removing the pivot in the ends of the handle members and then locking the said members to the gripping members by inserting pins through the openings in the lever members and the openings G in the gripping members. By reference to Fig. 3 it will be noticed that the lower lever or handle member is in the same vertical plane as the gripping member which is directly above it and is pivoted to the opposing lever member. This arrangement brings the several parts compactly together without necessitating the formation of forks in the ends of any of the parts, which would weaken the same and also increase the cost.

Having thus described my invention, what I claim, and desire to secure by Letters Patent, is—

1. In a pair of tongs, the combination with the gripping member provided with a plurality of transverse openings, of a jaw having ears provided with a plurality of transverse openings and a pivot-pin adapted to be inserted through registered transverse openings of the member and the jaw to attach the jaw to the member in various positions.

2. A pair of tongs consisting essentially of lever or handle members pivoted together, and gripping members also pivoted together, the lower ends of the gripping members being adjustably pivoted to the lever members.

3. A pair of tongs consisting essentially of lever members pivoted and provided near and below their pivot with enlargements having a plurality of transverse openings, gripping members pivoted together and having their lower portions curved around the pivoted ends of the lever members, and pivot-pins inserted through the lower ends of the gripping members and any one of transverse openings in the lever members.

4. The combination of the gripping members pivoted together and each having a plurality of transverse openings in its end, the lever members having pivot-openings in their ends and a plurality of transverse openings below their ends, pins inserted through the ends of the gripping members and openings in the lever members, and other pins adapted to be inserted through the registered openings in the lever and gripping members or through the pivot-openings in the ends of the lever members.

In testimony whereof I have signed this specification in the presence of two subscribing witnesses.

WARREN S. CASTERLIN.

Witnesses:
PAUL J. SHERWOOD,
FREDERICK HILLMAN.